US012643459B2

(12) United States Patent
Zhou et al.

(10) Patent No.: US 12,643,459 B2
(45) Date of Patent: Jun. 2, 2026

(54) MULTI-DIRECTIONAL EXPANDABLE TRANSFORMER HOUSE

(71) Applicant: A&C FUTURE, INC., Newport Beach, CA (US)

(72) Inventors: Zhuangboyu Zhou, Santa Ana, CA (US); Shoue Chen, Irvine, CA (US); Sichen Li, Santa Ana, CA (US); Jiuqi Wang, Santa Ana, CA (US); Yulai Shi, La Puente, CA (US); Ju Gao, Newport Beach, CA (US); Han Qin, Newport Beach, CA (US); Jiayang Qin, Newport Beach, CA (US)

(73) Assignee: A&C FUTURE, INC., Irvine, CA (US)

( * ) Notice: Subject to any disclaimer, the term of this patent is extended or adjusted under 35 U.S.C. 154(b) by 341 days.

(21) Appl. No.: 18/340,705

(22) Filed: Jun. 23, 2023

(65) Prior Publication Data

US 2024/0424974 A1      Dec. 26, 2024

(51) Int. Cl.
B60P 3/34          (2006.01)
H02S 30/20          (2014.01)

(52) U.S. Cl.
CPC ................ B60P 3/34 (2013.01); H02S 30/20 (2014.12)

(58) Field of Classification Search
None
See application file for complete search history.

(56) References Cited

U.S. PATENT DOCUMENTS

| | | | | |
|---|---|---|---|---|
| 3,341,986 A | * | 9/1967 | Brosig | B62D 53/067 |
| | | | | 52/67 |
| 4,133,571 A | * | 1/1979 | Fillios | B60P 3/34 |
| | | | | 296/165 |
| 4,355,834 A | | 10/1982 | Alford | |
| 4,421,943 A | * | 12/1983 | Withjack | F24S 25/70 |
| | | | | 136/246 |
| 6,257,638 B1 | * | 7/2001 | Graber | B60P 3/34 |
| | | | | 296/26.08 |
| 7,418,802 B2 | * | 9/2008 | Sarine | E04B 1/34305 |
| | | | | 52/79.5 |
| 8,347,560 B2 | * | 1/2013 | Gyory | E04B 1/34363 |
| | | | | 52/79.5 |
| 8,851,560 B1 | | 10/2014 | Freeman | |
| 2007/0144078 A1 | | 6/2007 | Frondelius | |

(Continued)

FOREIGN PATENT DOCUMENTS

CN          106740408          *    5/2017

*Primary Examiner* — Joseph D. Pape
(74) *Attorney, Agent, or Firm* — INNOVATION CAPITAL LAW GROUP, LLP; Vic Lin

(57) ABSTRACT

A mobile expandable structure can expand both outward, from at least one side thereof, and rearward, from a back side thereof. When expanded, the mobile expandable structure can provide an expansion of about 2.5 to about 3 times the original living space provided by the main structure. The structure may be on an electric chassis and the structure can include a solar array that is disposed, in the stowed configuration, over the main structure. The solar array is expandable to cover some or all of the expansion sections when in the expanded configuration. The expansion sections can include pivotable floor members that pivot downward upon expansion of each 10 expansion section. Side walls of the side expansion may be unfolded to provide sides of the side expansion section.

17 Claims, 15 Drawing Sheets

(56) References Cited

U.S. PATENT DOCUMENTS

| | | | |
|---|---|---|---|
| 2012/0073885 A1* | 3/2012 | Glynn | B60K 16/00 |
| | | | 180/2.2 |
| 2015/0102632 A1 | 4/2015 | Pham | |
| 2017/0063290 A1* | 3/2017 | Kurlagunda | B60L 8/003 |
| 2018/0079348 A1 | 3/2018 | Ronsen | |
| 2021/0242823 A1 | 8/2021 | Cohenmeyer | |
| 2022/0161877 A1 | 5/2022 | Pollon | |
| 2023/0158977 A1 | 5/2023 | Howlett | |

* cited by examiner

MULTI-DIRECTIONAL EXPANDABLE TRANSFORMER HOUSE

BACKGROUND OF THE INVENTION

1. Field of the Invention

Embodiments of the invention relate generally to expandable structures. More particularly, embodiments of the invention relate to an expandable house structure that includes a foldable side expansion space and a rear expansion space along with expandable solar panel coverage.

2. Description of Prior Art and Related Information

The following background information may present examples of specific aspects of the prior art (e.g., without limitation, approaches, facts, or common wisdom) that, while expected to be helpful to further educate the reader as to additional aspects of the prior art, is not to be construed as limiting the present invention, or any embodiments thereof, to anything stated or implied therein or inferred thereupon.

Recently, the expandable house structure is attracting more attention both in the fields of mobile homes and recreational vehicles (RVs). The expansion mode will determine the effective living area, complexity of the driving and control system, and cost for purchase and maintenance. Exploring a concise and reliable folding/expansion mechanism is of great importance.

Electric vehicle chassis are becoming more popular in both cost of fuel and for mitigating environmental issues. Recreational vehicles seldom rely on such an electric or even hybrid system, often due to their large size and weight. Thus, the possibility of an expandable vehicle on an electric vehicle chassis may be advantageous, however, such a design is currently unavailable.

In view of the foregoing, there is a need for an expandable house structure that can expand living space while providing expanded solar panel space for charging the vehicle and providing power for the structure when a power supply is not available.

SUMMARY OF THE INVENTION

Embodiments of the present invention aim to solve the aforementioned problems in conventional expandable structures by providing an expandable structure that can expand both out a side and a rear of the main structure. A solar panel array can also expand to cover all or part of the expansion sections.

Embodiments of the present invention provide an expandable structure comprising a main structure; a first expansion section, the first expansion section expandable outward in a first direction from a side of the main structure; a second expansion section, the second expansion section expandable rearward in a second direction from the main structure; and a solar array mounted over the main structure in the stowed configuration, the solar array expandable over at least a portion of one or both of the first and second expansion sections after the expandable structure is expanded into the expanded configuration.

Embodiments of the present invention provide an expandable structure comprising a main structure; a first expansion section, the first expansion section expandable outward in a first direction from a side of the main structure; and a second expansion section, the second expansion section expandable rearward in a second direction from the main structure, wherein the first expansion section includes a first frame assembly having a first outer wall, a first roof extending from a top of the first outer wall, and at least one guide rail extending from a bottom of the first outer wall, below the first roof, a first floor member pivotably and slidable attached to an inner surface of the first outer wall, wherein the first roof and the at least one guide rail extends into the main structure when the first expansion section is in a retracted configuration, and first expansion section side walls foldably attached to the main structure, the first expansion section side walls pivotable to provide side walls of the first expansion section when in the expanded configuration; and the second expansion section includes a second frame assembly having a second outer wall, a second roof extending from a top of the second outer wall and second expansion section side walls extending downward from the roof, and a second floor member pivotably and slidable attached to an inner surface of the second outer wall, wherein the second roof and the second expansion section side walls extend into the main structure when the second expansion section is in a retracted configuration.

Embodiments of the present invention provide an expandable structure comprising a main structure; a first expansion section, the first expansion section expandable outward in a first direction from a side of the main structure; a second expansion section, the second expansion section expandable rearward in a second direction from the main structure; and a solar array mounted over the main structure in the stowed configuration, the solar array expandable over at least a portion of one or both of the first and second expansion sections after the expandable structure is expanded into the expanded configuration, wherein the solar array includes a solar panel assembly expandable in a third direction, opposite the first direction, a sliding rear solar panel assembly that slides outward from the main structure to be disposed over a roof of the second expansion section, and one or more extendable side solar panel assemblies that move outward from the main structure to be disposed over a roof of the first expansion section; the first expansion section includes a first frame assembly having a first outer wall, a first roof extending from a top of the first outer wall, and at least one guide rail extending from a bottom of the first outer wall, below the first roof, a first floor member pivotably and slidable attached to an inner surface of the first outer wall, wherein the first roof and the at least one guide rail extends into the main structure when the first expansion section is in a retracted configuration, and first expansion section side walls foldably attached to the main structure, the first expansion section side walls pivotable to provide side walls of the first expansion section when in the expanded configuration; and the second expansion section includes a second frame assembly having a second outer wall, a second roof extending from a top of the second outer wall and second expansion section side walls extending downward from the roof, and a second floor member pivotably and slidable attached to an inner surface of the second outer wall, wherein the second roof and the second expansion section side walls extend into the main structure when the second expansion section is in a retracted configuration.

These and other features, aspects and advantages of the present invention will become better understood with reference to the following drawings, description and claims.

BRIEF DESCRIPTION OF THE DRAWINGS

Some embodiments of the present invention are illustrated as an example and are not limited by the figures of the accompanying drawings, in which like references may indicate similar elements.

Figure 1:
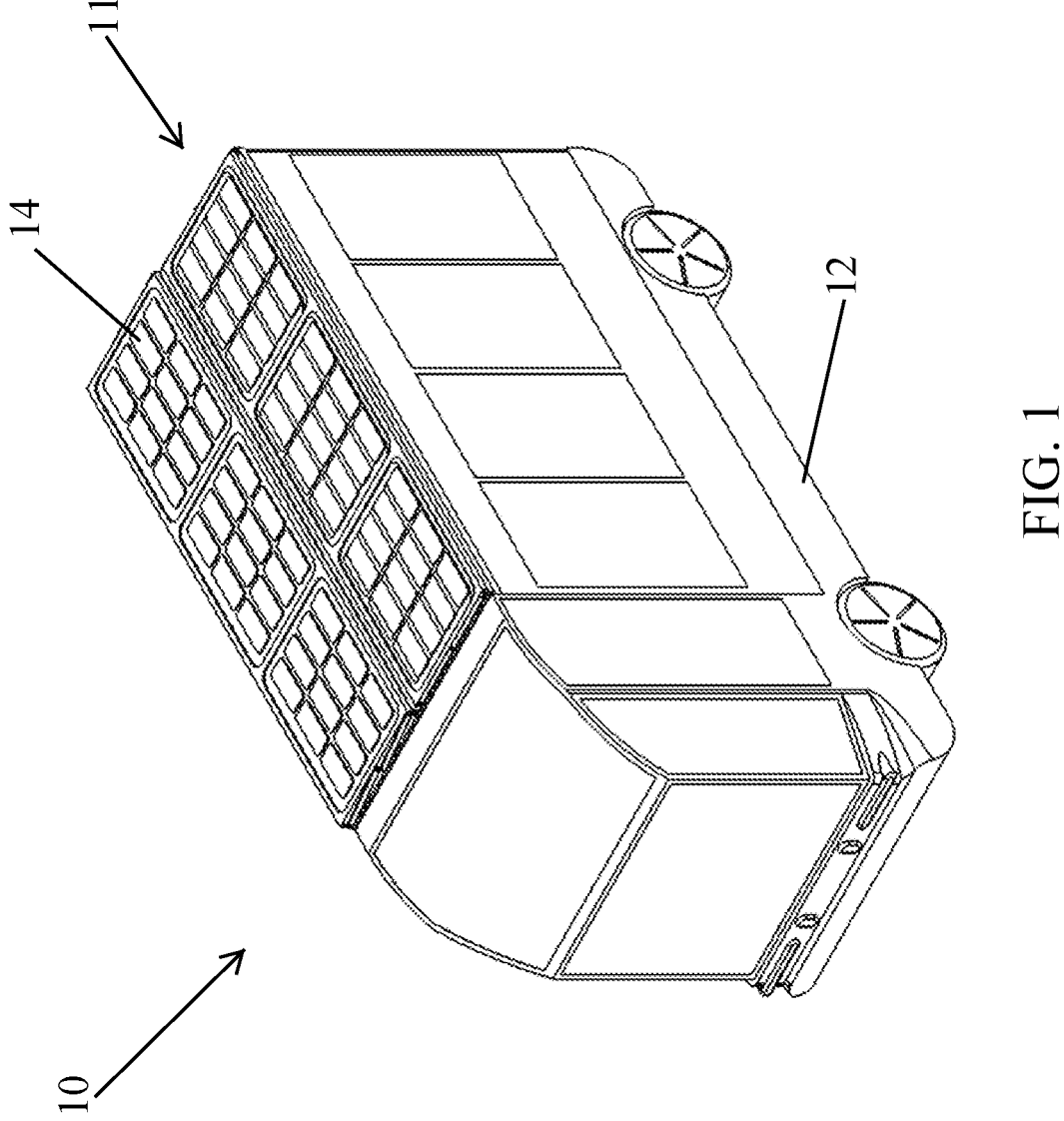
FIG. 1 illustrates a front left side perspective view of an expandable mobile structure according to an exemplary embodiment of the present invention.

The illustrations in the figures may not necessarily be drawn to scale.

The invention and its various embodiments can now be better understood by turning to the following detailed description wherein illustrated embodiments are described. It is to be expressly understood that the illustrated embodiments are set forth as examples and not by way of limitations on the invention as ultimately defined in the claims.

DETAILED DESCRIPTION OF THE PREFERRED EMBODIMENTS AND BEST MODE OF INVENTION

The terminology used herein is for the purpose of describing particular embodiments only and is not intended to be limiting of the invention. As used herein, the term "and/or" includes any and all combinations of one or more of the associated listed items. As used herein, the singular forms "a," "an," and "the" are intended to include the plural forms as well as the singular forms, unless the context clearly indicates otherwise. It will be further understood that the terms "comprises" and/or "comprising," when used in this specification, specify the presence of stated features, steps, operations, elements, and/or components, but do not preclude the presence or addition of one or more other features, steps, operations, elements, components, and/or groups thereof.

Unless otherwise defined, all terms (including technical and scientific terms) used herein have the same meaning as commonly understood by one having ordinary skill in the art to which this invention belongs. It will be further understood that terms, such as those defined in commonly used dictionaries, should be interpreted as having a meaning that is consistent with their meaning in the context of the relevant art and the present disclosure and will not be interpreted in an idealized or overly formal sense unless expressly so defined herein.

In describing the invention, it will be understood that a number of techniques and steps are disclosed. Each of these has individual benefit and each can also be used in conjunction with one or more, or in some cases all, of the other disclosed techniques. Accordingly, for the sake of clarity, this description will refrain from repeating every possible combination of the individual steps in an unnecessary fashion. Nevertheless, the specification and claims should be read with the understanding that such combinations are entirely within the scope of the invention and the claims.

In the following description, for purposes of explanation, numerous specific details are set forth in order to provide a thorough understanding of the present invention. It will be evident, however, to one skilled in the art that the present invention may be practiced without these specific details.

The present disclosure is to be considered as an exemplification of the invention and is not intended to limit the invention to the specific embodiments illustrated by the figures or description below.

As is well known to those skilled in the art, many careful considerations and compromises typically must be made when designing for the optimal configuration of a commercial implementation of any system, and in particular, the embodiments of the present invention. A commercial implementation in accordance with the spirit and teachings of the present invention may be configured according to the needs of the particular application, whereby any aspect(s), feature(s), function(s), result(s), component(s), approach(es), or step(s) of the teachings related to any described embodiment of the present invention may be suitably omitted, included, adapted, mixed and matched, or improved and/or optimized by those skilled in the art, using their average skills and known techniques, to achieve the desired implementation that addresses the needs of the particular application.

Broadly, embodiments of the present invention provide a mobile expandable structure that can expand both outward, from at least one side thereof, and rearward, from a back side thereof. When expanded, the mobile expandable structure can provide an expansion of about 2.5 to about 3 times the original living space provided by the main structure. The structure may be on an electric chassis and the structure can include a solar array that is disposed, in the stowed configuration, over the main structure. The solar array is expandable to cover some or all of the expansion sections when in the expanded configuration. The expansion sections can include pivotable floor members that pivot downward upon expansion of each expansion section. Side walls of the side expansion may be unfolded to provide sides of the side expansion section.

Figure 2:
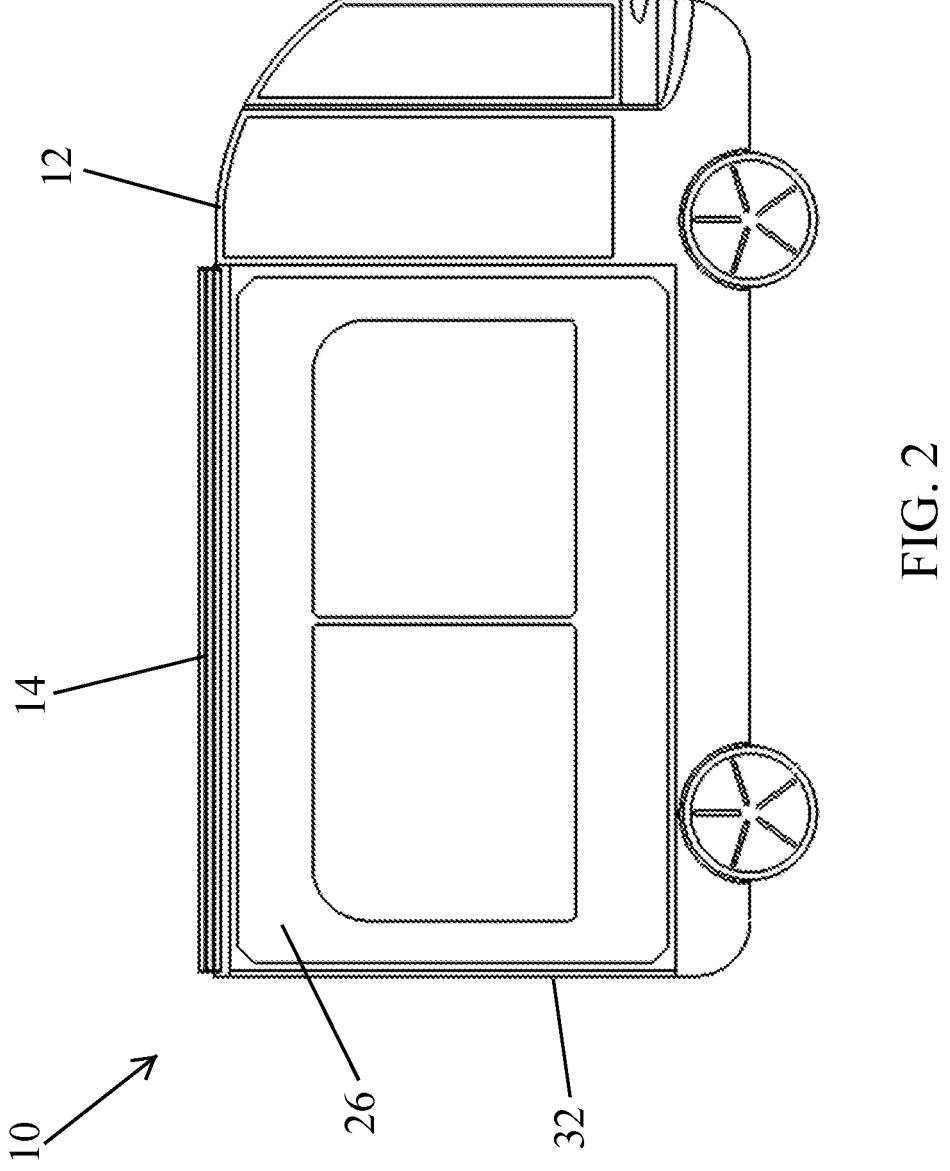
FIG. 2 illustrates a right side view of the expandable mobile structure of FIG. 1.
Figure 3:
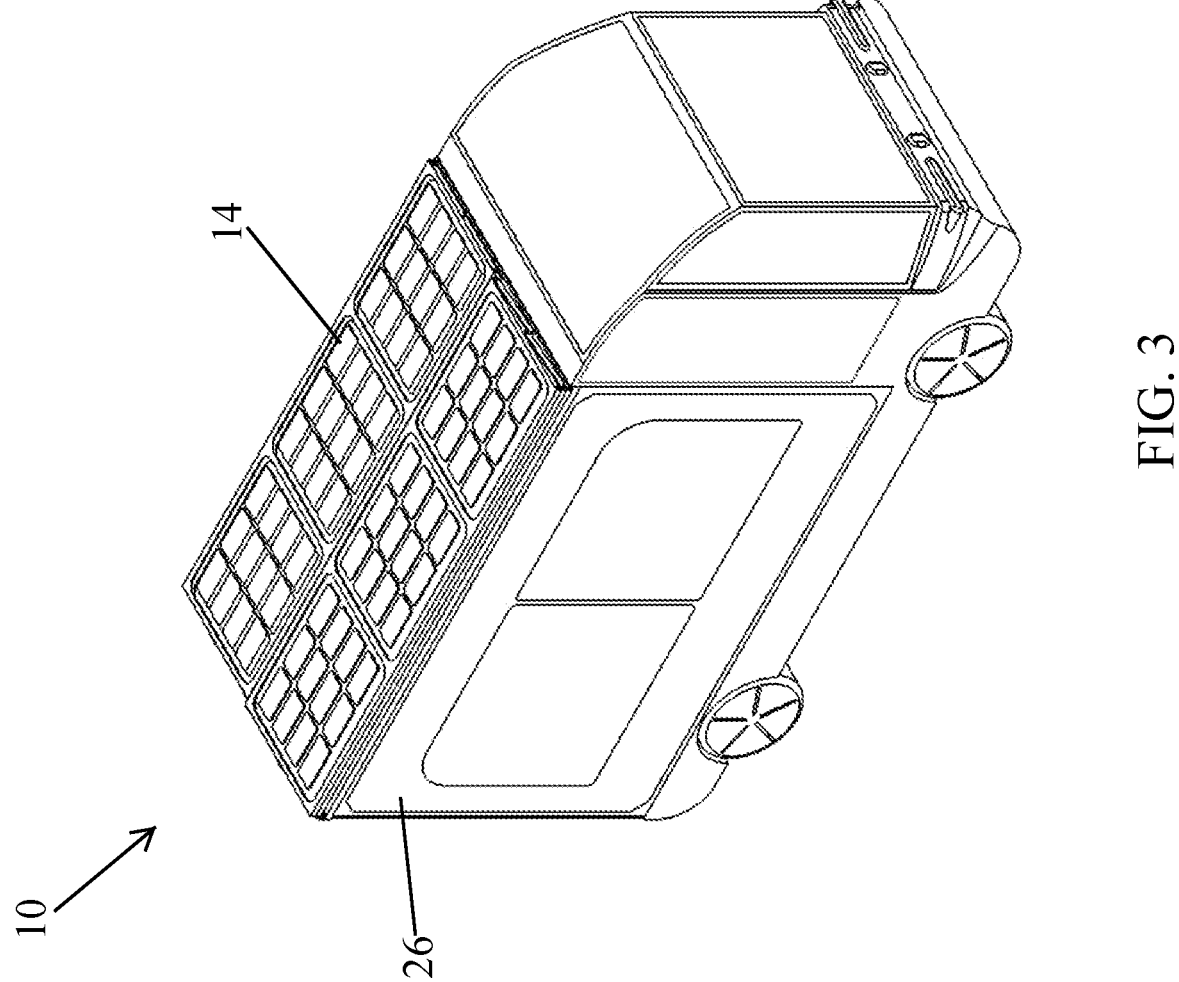
FIG. 3 illustrates a front right side perspective view of the expandable mobile structure of FIG. 1.
Figure 4:
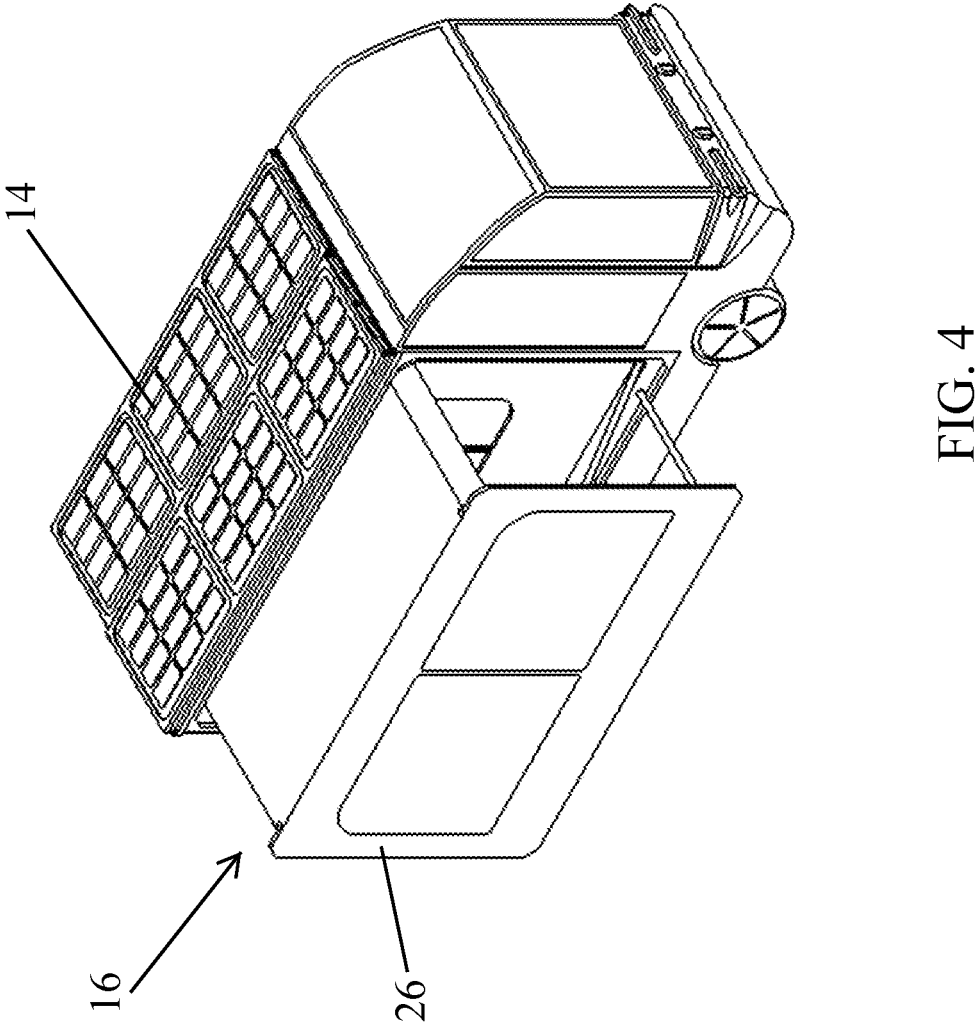
FIG. 4 illustrates a front right side perspective view of the expandable mobile structure of FIG. 1, with the first expansion section beginning its expansion process.
Figure 5:
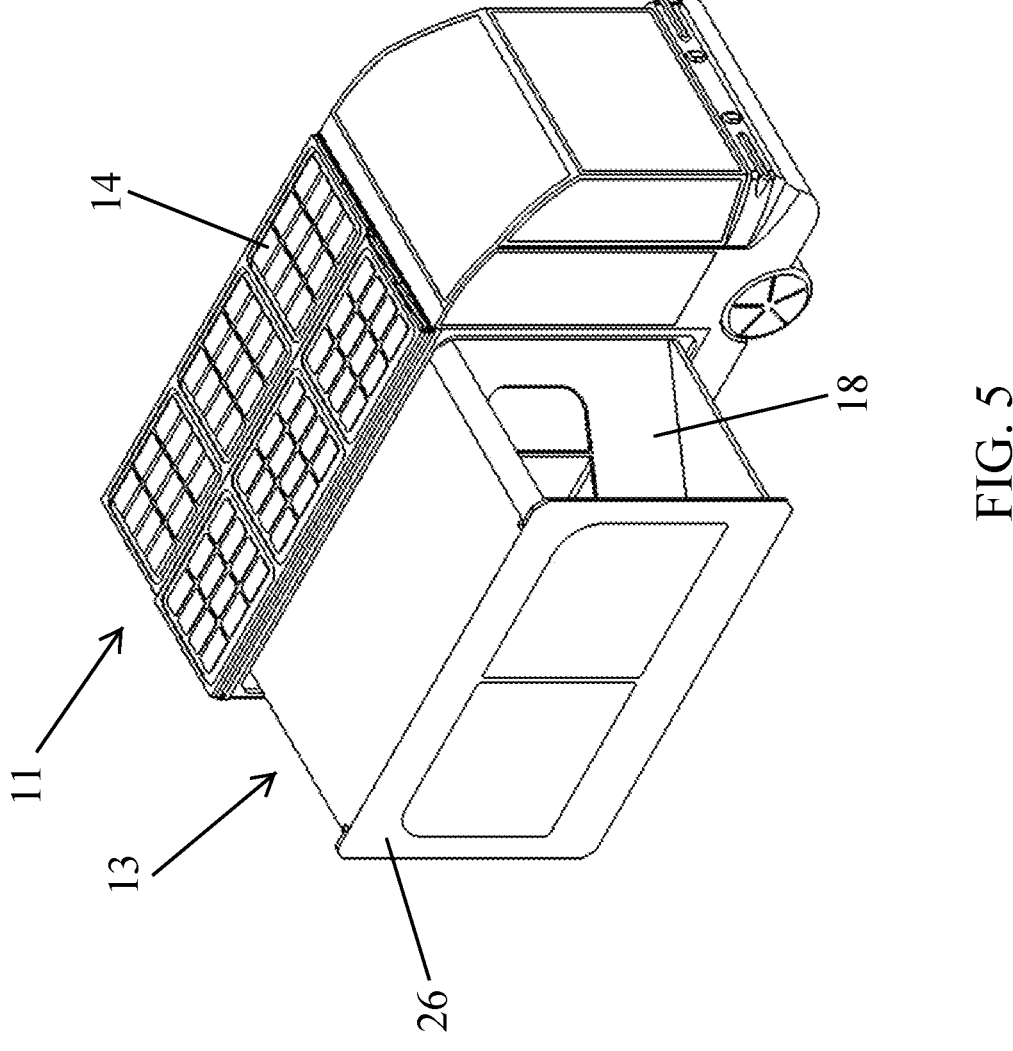
FIG. 5 illustrates a front right side perspective view of the expandable mobile structure of FIG. 1, with the first expansion section continuing its expansion process.

Referring to FIGS. 1 through 3, a expandable mobile structure 10 (also referred to as vehicle 10, or recreational vehicle 10) can include a main body 12 with a solar array 14 on a top surface thereof. The main body 12 may define the main section 11. As discussed in greater detail below, outer wall 26 may expand outward during expansion of a first expansion section. Further, a rear wall 32 may expand rearward curing expansion of a second expansion section.

Referring now to FIGS. 4 through 8, the expansion of the first expansion section 13 is shown. A frame structure 16 of the first expansion section 13, as best seen in FIG. 6B, can include a roof structure 22 and at least one guide rail 24 (such as two guide rails 24, as shown in FIG. 6B) that extend into the main structure 11 in the retracted configuration and help guide the frame structure 16 outward during expansion. Once the frame structure 16 is fully expanded, side walls 18, 20 can pivot to provide side walls for the expansion section 13. When retracted, the side walls 18, 20 may be folded against the main structure 11, sandwiched between the main structure 11 and the outer wall 26, as best seen in FIG. 6A.

Figures 6A, 6B, 6C:
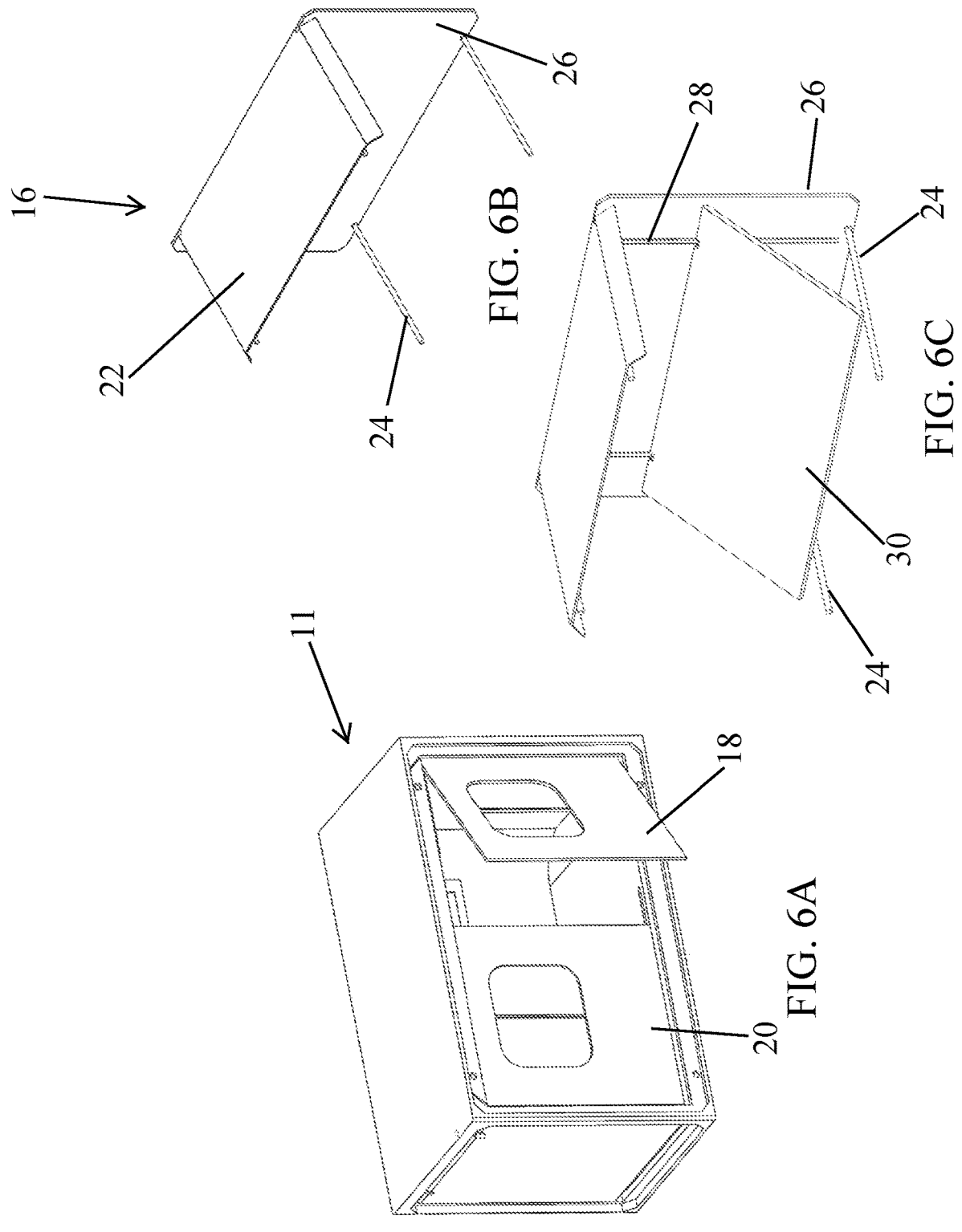
FIG. 6A illustrates a perspective view of the main structure, with the expansion wall removed for clarity, illustrating unfolding of the side walls of the first expansion section.
FIG. 6B illustrates a perspective view of the expansion wall of the first expansion section.
FIG. 6C illustrates a perspective view of a floor deployment mechanism as the expansion wall is deployed outward, with the main structure removed for clarity.
Figure 7:
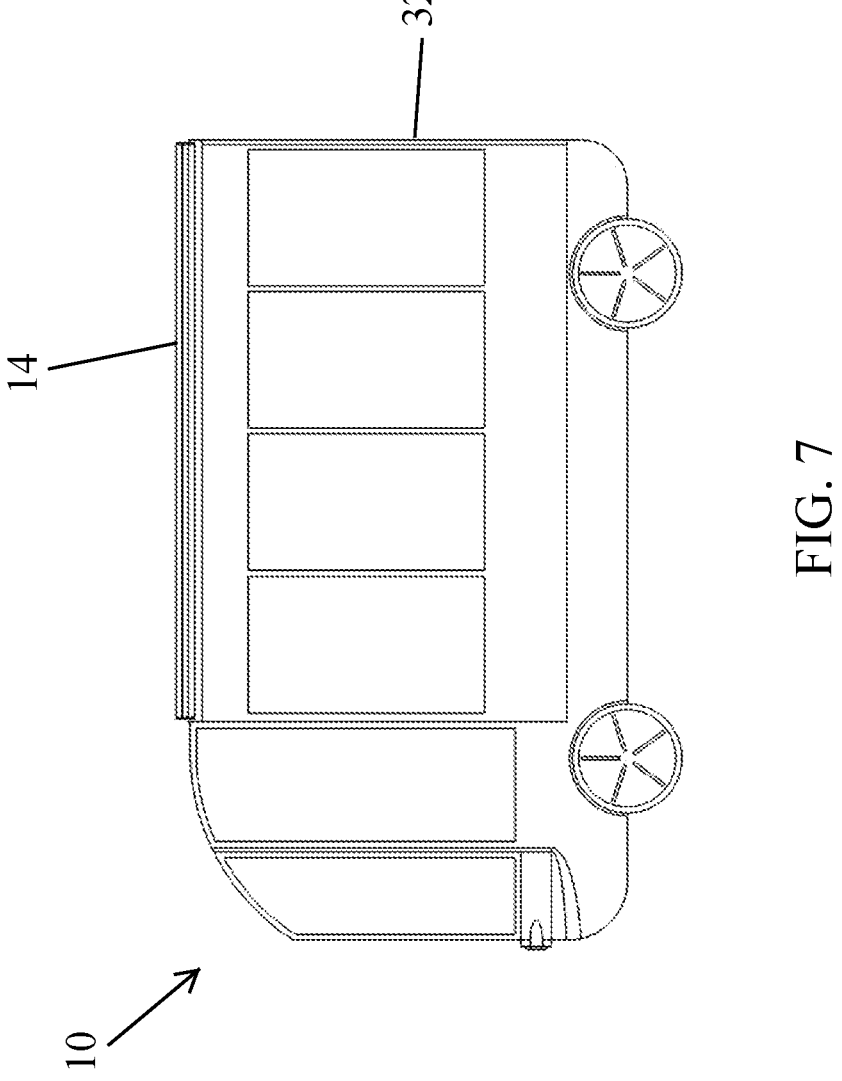
FIG. 7 illustrates a left side view of the expandable mobile structure of FIG. 1.
Figure 8:
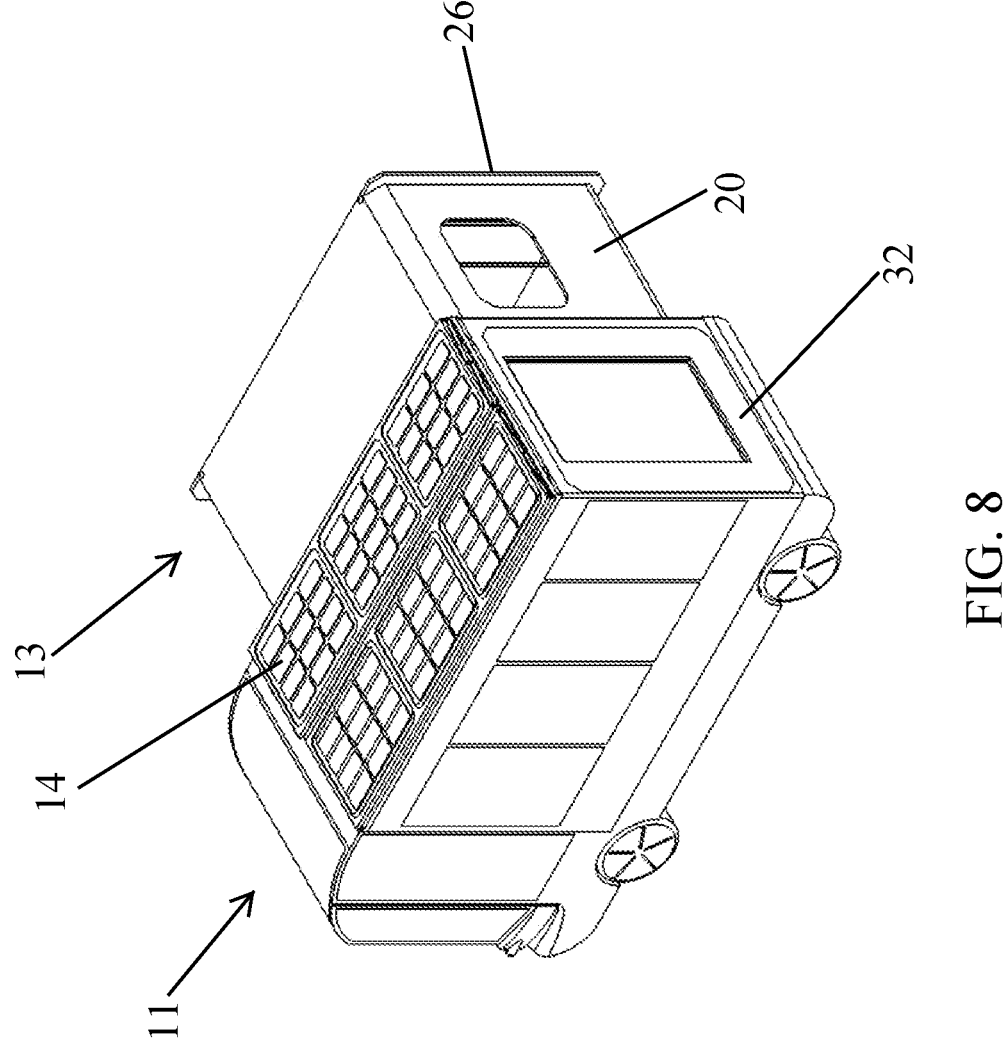
FIG. 8 illustrates a rear left side perspective view of the expandable mobile structure of FIG. 1, with the first expansion section fully deployed.

During expansion, a floor member 30 may be moved from its retracted position, disposed adjacent to and generally coplanar with the outer wall 26, to its expanded position, providing a floor surface for the expansion section 13. The floor member 30 may move along a guide path 28 provided on the interior of the outer wall 26, as best seen in FIG. 6C. Thus, in the retracted configuration, the floor member 30 may be sandwiched between the outer wall 26 and the side walls 18, 20.

Figure 9:
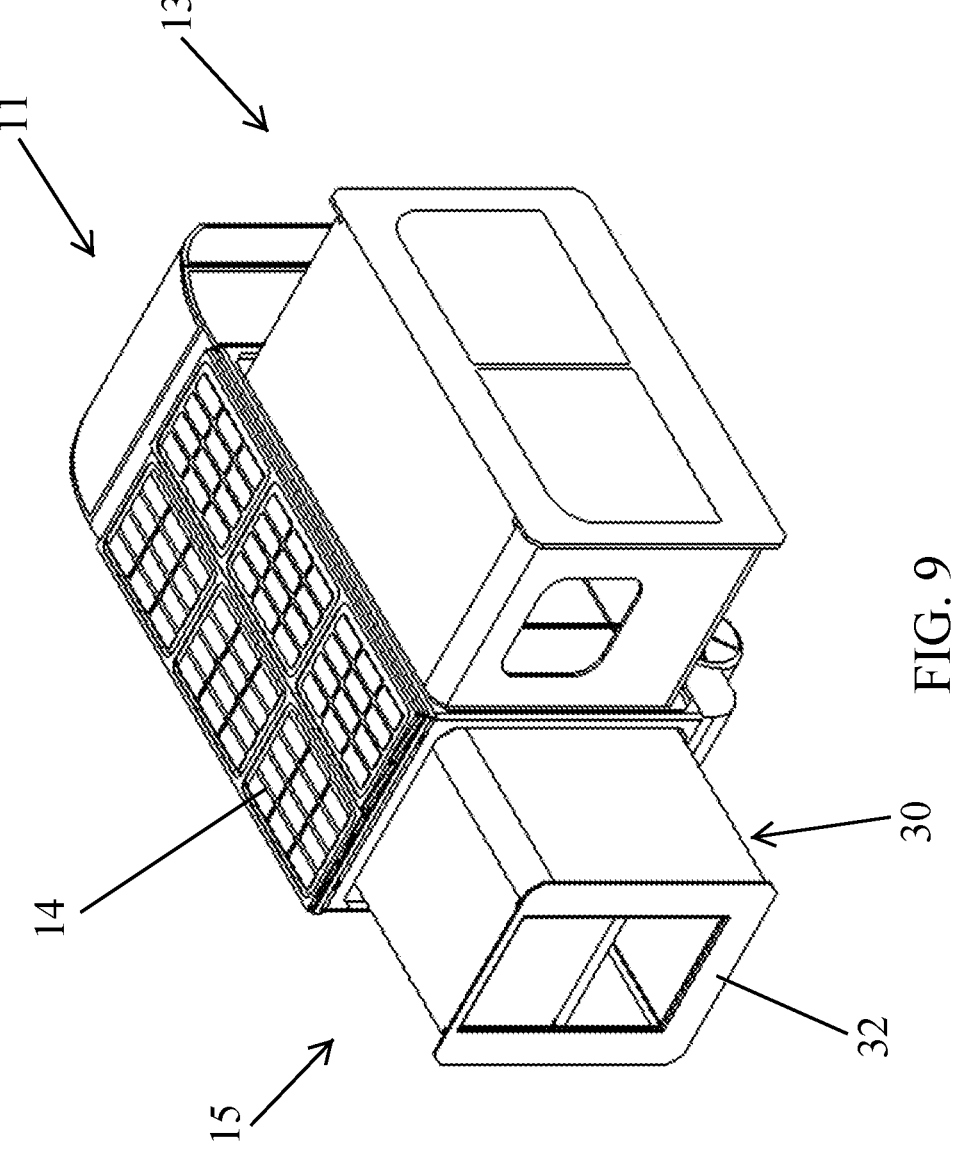
FIG. 9 illustrates a rear right side perspective view of the expandable mobile structure of FIG. 1, showing the second (rear) expansion section beginning its expansion process.
Figures 10A, 10B, 10C:
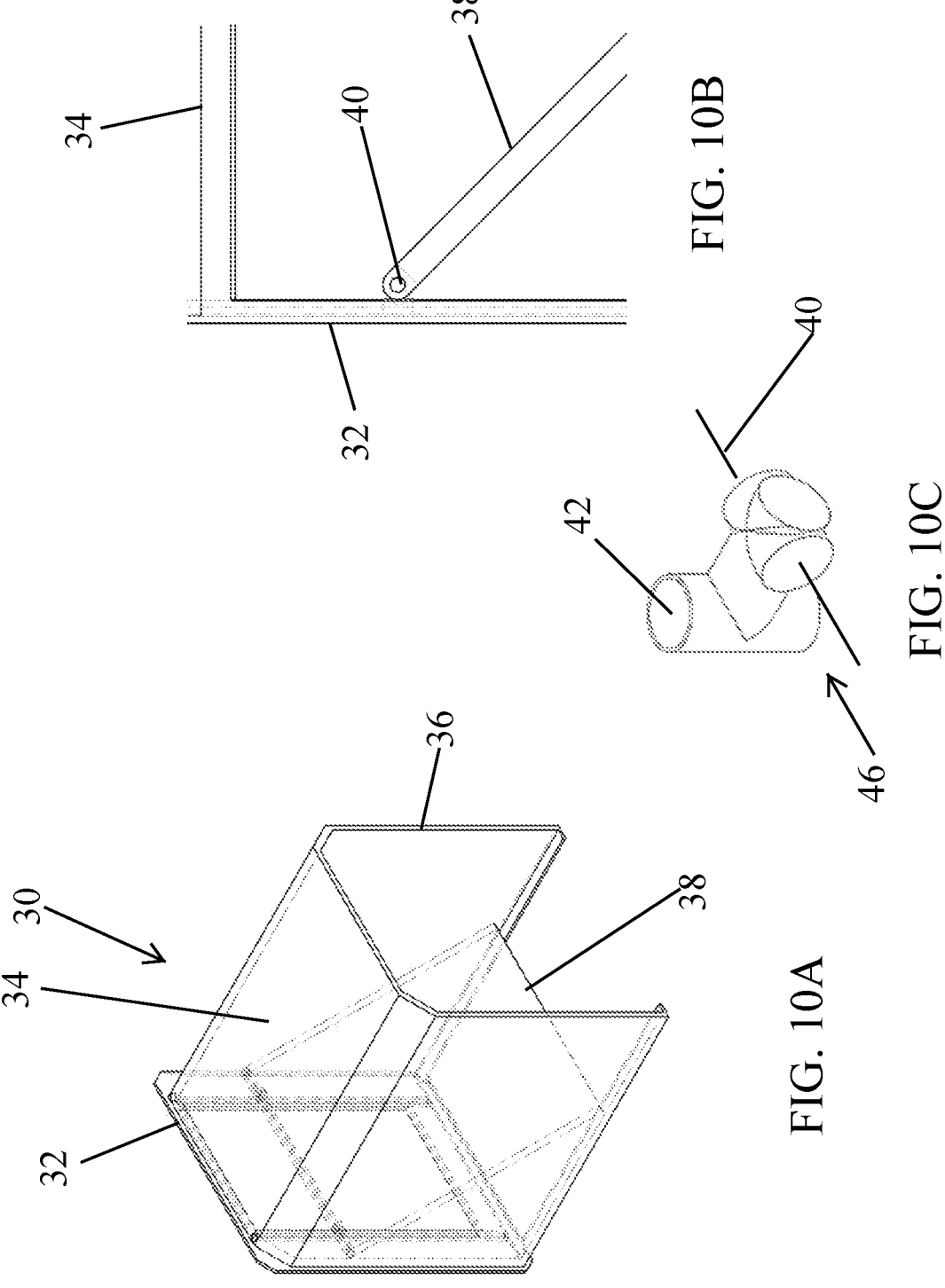
FIG. 10A illustrates the second expansion section, removed from the main structure for clarity, showing the floor deployment as the second expansion section is expanded outward.
FIG. 10B illustrates a floor-outer wall connection of the second expansion section.
FIG. 10C illustrates a connector for attaching the floor to the outer wall, according to an exemplary embodiment of the present invention.
Figure 11:
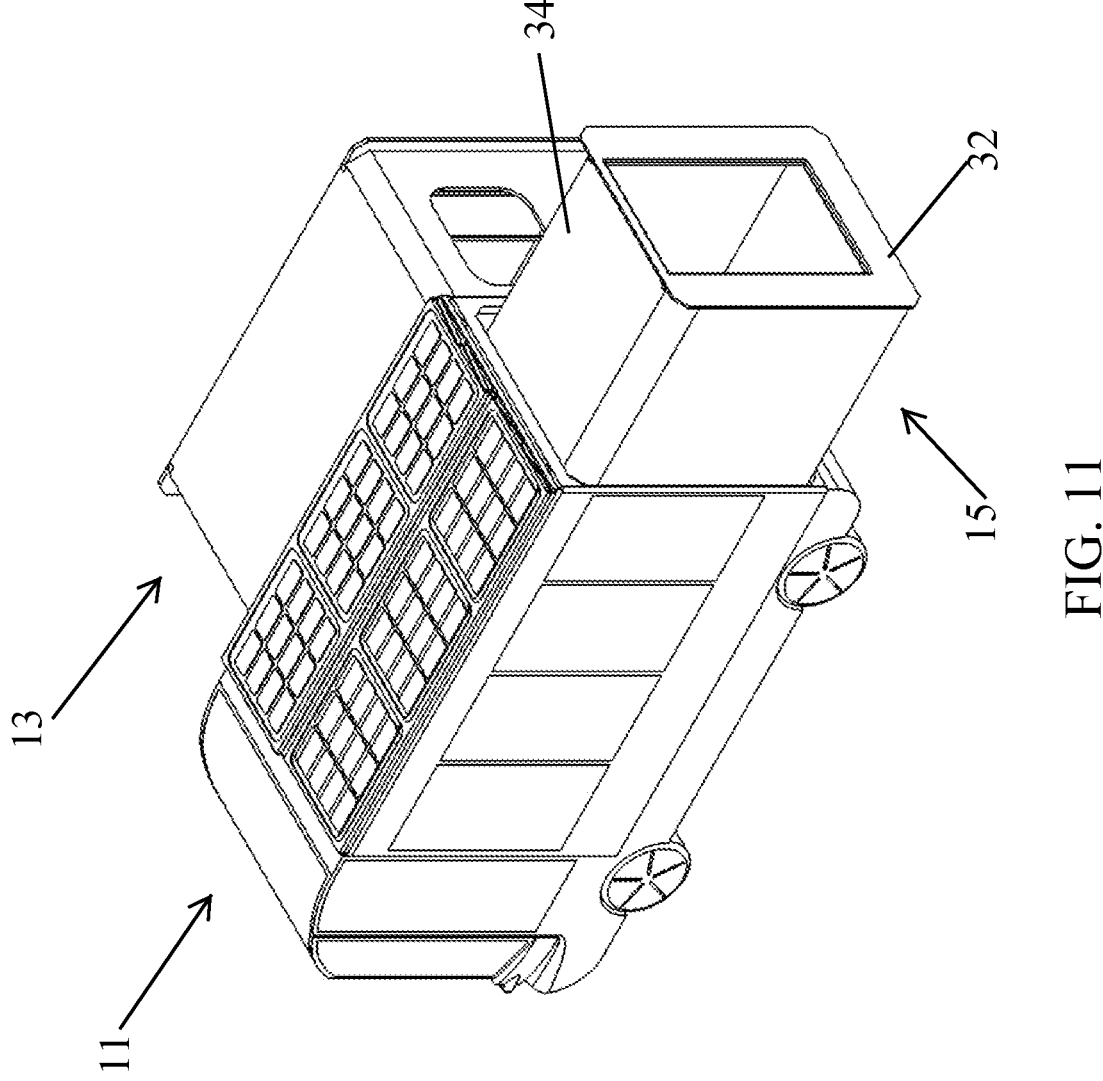
FIG. 11 illustrates a rear left side perspective view of the expandable mobile structure of FIG. 1 with the first (side) and second (rear) expansion sections fully expanded.

Referring to FIGS. 9 through 11, the expansion of the second expansion section 15 is illustrated. A second expansion section frame structure 30 can include, as best seen in FIG. 10A, the outer wall 32, a roof 34 extending from the outer wall 32, and side walls 36 extending downward from the roof 34.

A floor member 38 may be pivotably attached to the inside of the outer wall 32 and may pivot about a pivot axis 40 during expansion of the frame structure 30, as best seen in FIGS. 10A and 10B. The floor member 38 may be sandwiched between the main structure 11 and the outer wall 32 when the second expansion section 15 is retracted. During expansion, the floor member 38 may move down the outer wall 32, via a sliding pivot connector 46, as shown in FIG. 10C, where the vertical axis 42 may be vertically slidably disposed inside or adjacent to the outer wall 32 and the pivot axis 40 may provide a pivot connection to the floor member 38. The floor member 38 may also slide along tracks 44 formed in the side walls, during expansion thereof. Of course, this connection mechanism, or other similar connection mechanisms may be used to provide a movable floor member both in the second expansion section 15 as well as in the first expansion section 13. Regardless of the specific connection mechanism, the floor member may vertically slide along the inside of the outer wall and pivot during expansion of the expansion sections 13, 15.

Figure 12:
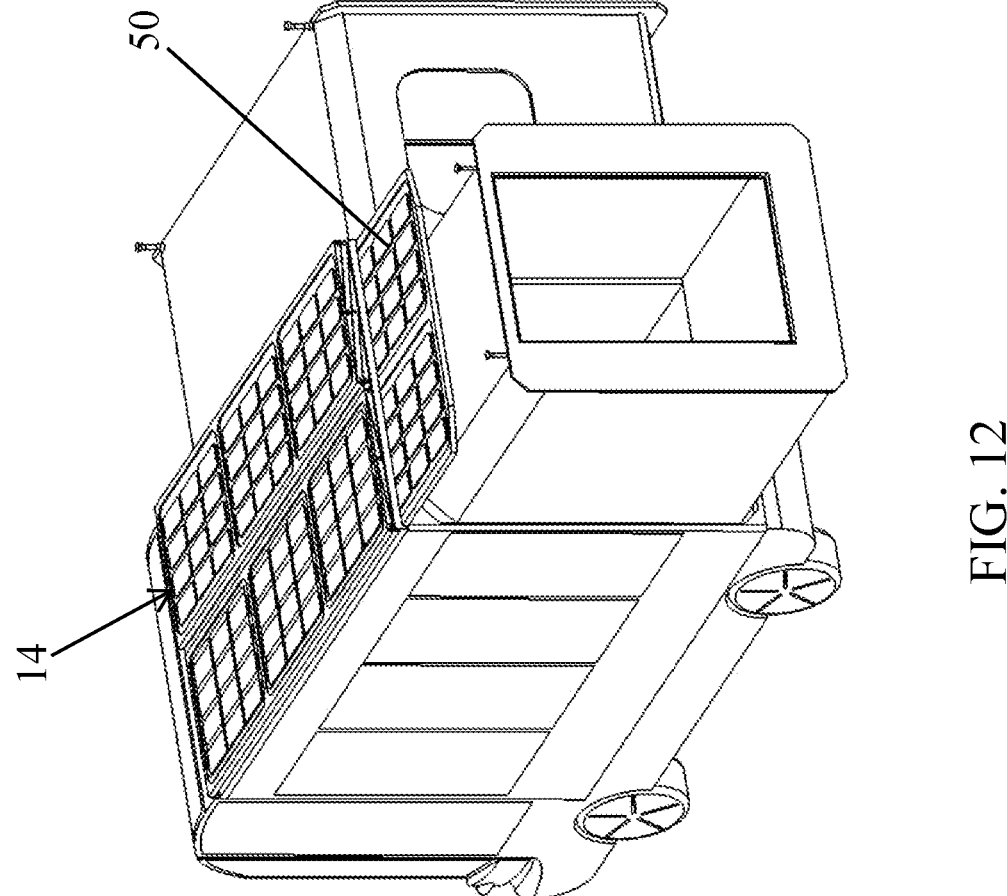
FIG. 12 illustrates a rear left side perspective view of the expandable mobile structure of FIG. 1, showing expansion of a solar array by sliding out a rear solar array, stored under the solar array on the main structure, to cover some or all of the second (rear) expansion section.
Figure 13:
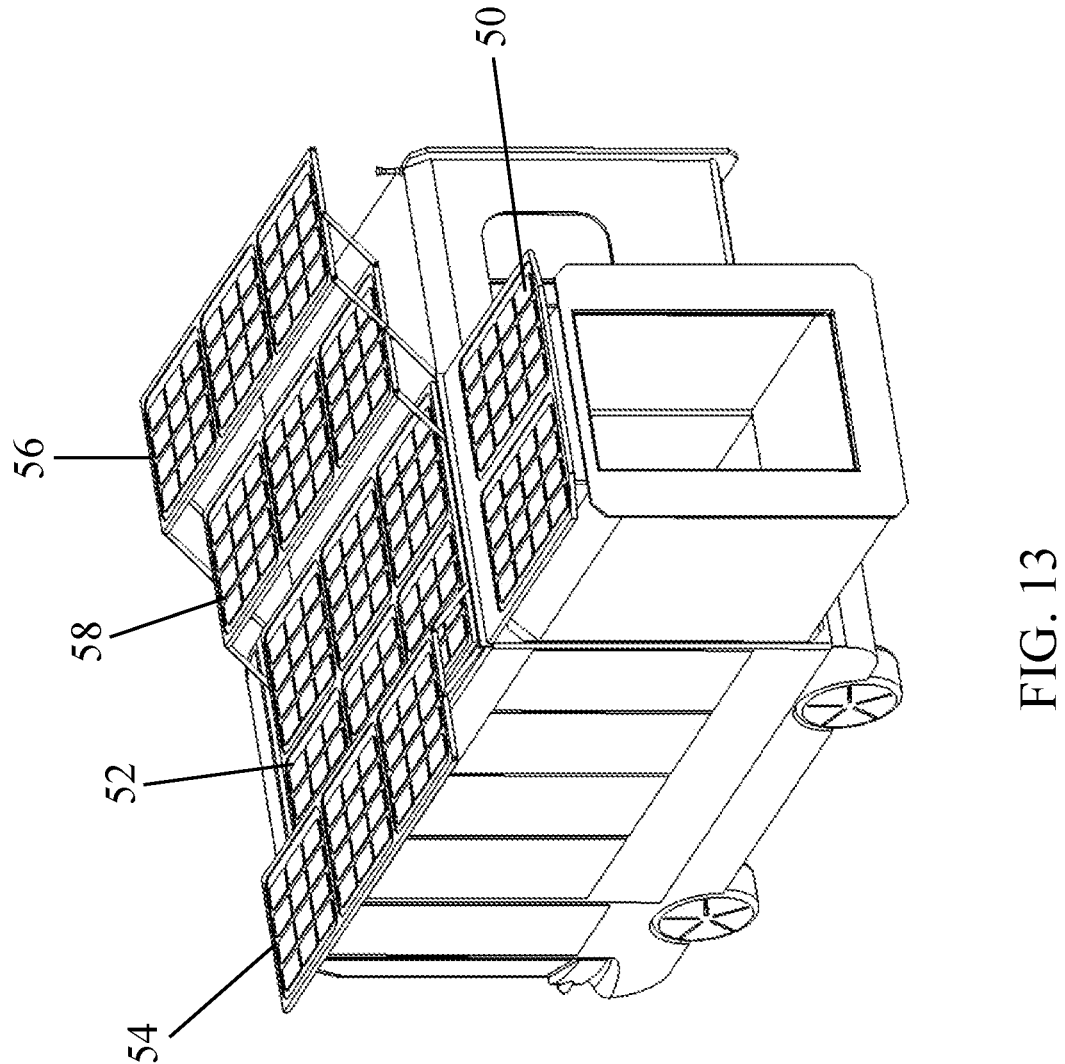
FIG. 13 illustrates a rear left side perspective view of the expandable mobile structure of FIG. 1, showing expansion of the solar array by pivoting out additional solar panels from being stored on top of the main structure to cover some or all of the first (side) expansion section.
Figure 14:
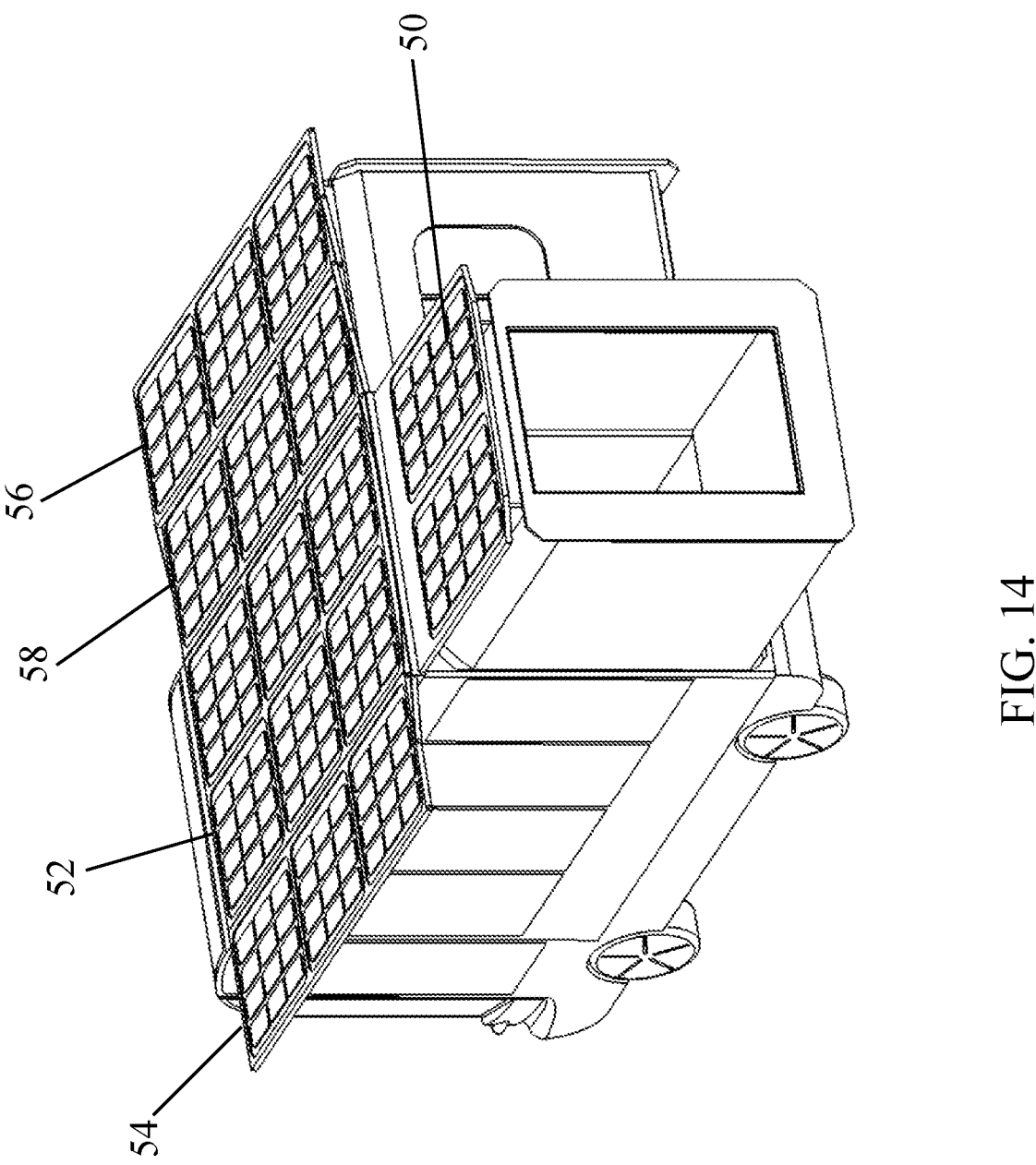
FIG. 14 illustrates a rear left side perspective view of the expandable mobile structure of FIG. 1, showing the full expansion of the solar array.

Referring now to FIGS. 12 through 14, the solar array 14 may be disposed over the main section 11 during transport of the vehicle 10. After the expansion sections 13, 15 are expanded, the solar array 14 may also expand beyond the main section 11. As shown in FIG. 12, a rear solar panel assembly 50 may slide outward from the solar array 14, typically from a region directly adjacent the main body 12 of the main structure 11. When fully slid outward, the rear solar panel assembly 50 may cover all or nearly all of the roof of the second expansion section 15.

As shown in FIG. 13, the solar array can be further expanded by providing one or more side solar panel assemblies 56, 58 that may expand outward from the main structure 11 to cover all or nearly all of the roof of the first expansion section 13. Further, in some embodiments, a non-expansion side solar panel assembly 54 may expand outward, from a side of the main structure that does not include an expansion section, to provide even further surface area for the solar array, as shown in FIG. 14. Once all of the panel assemblies 54, 56, 58, 50 are expanded outward from the main structure 11, a base solar panel assembly 52 remains on top of the main structure, as shown in FIGS. 13 and 14.

Figure 15:
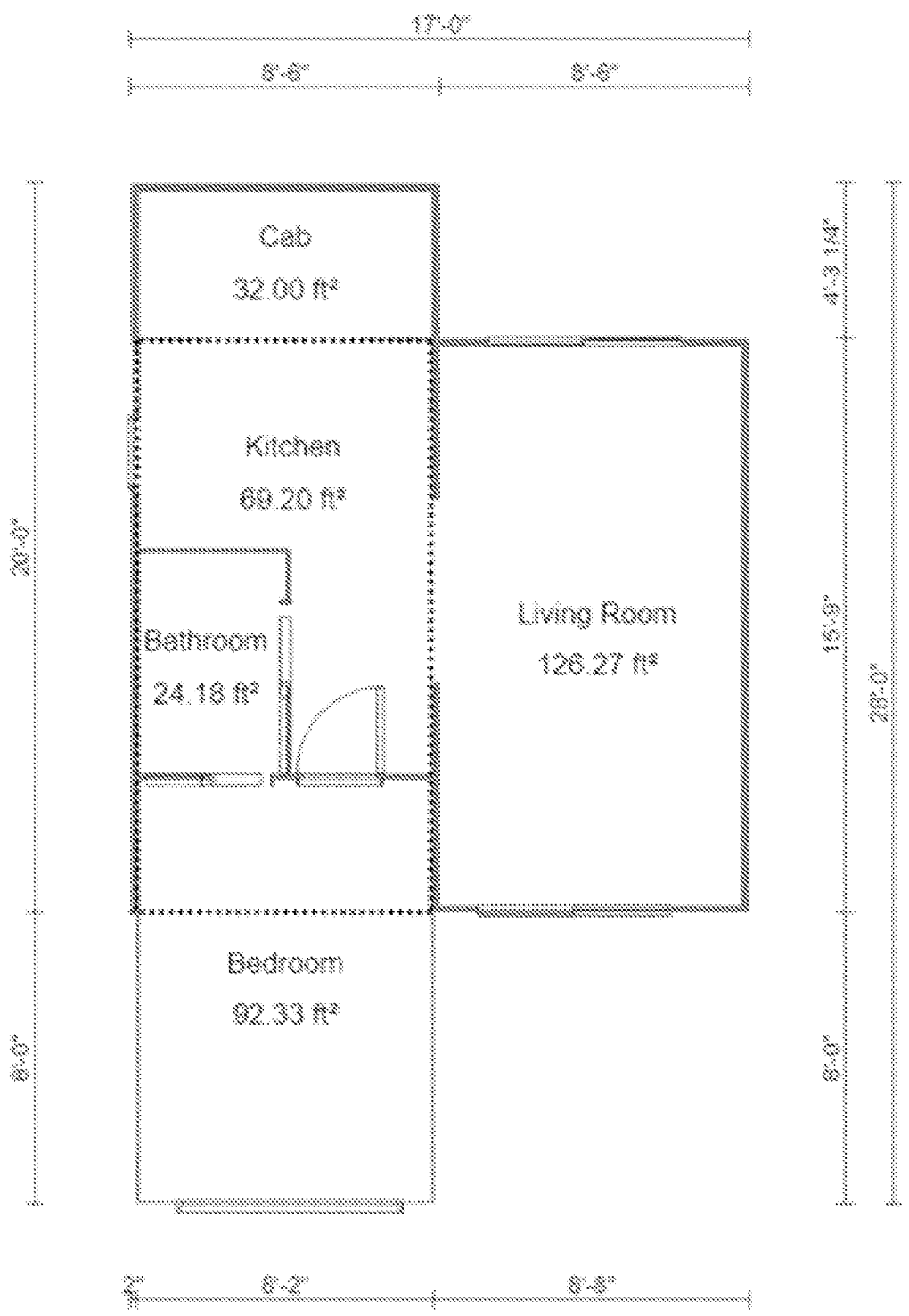
FIG. 15 illustrates an exemplary floor plan for the expandable mobile structure of FIG. 1, in an expanded state, where the dimensions shows are illustrative and may vary depending on design and application.

Referring to FIG. 15, one embodiment of a floor plan is shown, with exemplary dimensions. It should be understood that the specifics illustrated are just one example of a configuration for the vehicle 10 of the present invention. As can be seen, when expanded, the floor space can be increased from about 2.5 times to about 3 times the floor space of the main structure (as shown by the dotted line). By expanding both outwards and rearwards, the main structure may be relatively small, for example, about 20 feet by 8.5 feet, suitable for highway travel. Once parked, the vehicle can be expanded to provide substantially larger living space.

Further, a portion of the rear room (labeled bedroom in FIG. 15) may be part of the main structure 11, while, once expanded, the majority of the rear room is part of the expansion section 15. This design allows for the storage of furniture, such as bedroom furniture, in the main structure portion of the room. In some embodiments, furniture, such as a bed, may be affixed to the floor member 38 so that the furniture may remain attached to the floor member 38, both in the expanded and retracted configurations, providing ease of set up for the rear expansion section 15.

All the features disclosed in this specification, including any accompanying abstract and drawings, may be replaced by alternative features serving the same, equivalent or similar purpose, unless expressly stated otherwise. Thus, unless expressly stated otherwise, each feature disclosed is one example only of a generic series of equivalent or similar features.

Claim elements and steps herein may have been numbered and/or lettered solely as an aid in readability and understanding. Any such numbering and lettering in itself is not intended to and should not be taken to indicate the ordering of elements and/or steps in the claims.

Many alterations and modifications may be made by those having ordinary skill in the art without departing from the spirit and scope of the invention. Therefore, it must be understood that the illustrated embodiments have been set forth only for the purposes of examples and that they should not be taken as limiting the invention as defined by the following claims. For example, notwithstanding the fact that the elements of a claim are set forth below in a certain combination, it must be expressly understood that the invention includes other combinations of fewer, more or different ones of the disclosed elements.

The words used in this specification to describe the invention and its various embodiments are to be understood not only in the sense of their commonly defined meanings, but to include by special definition in this specification the generic structure, material or acts of which they represent a single species.

The definitions of the words or elements of the following claims are, therefore, defined in this specification to not only include the combination of elements which are literally set forth. In this sense it is therefore contemplated that an equivalent substitution of two or more elements may be made for any one of the elements in the claims below or that a single element may be substituted for two or more elements in a claim. Although elements may be described above as acting in certain combinations and even initially claimed as such, it is to be expressly understood that one or more elements from a claimed combination can in some cases be excised from the combination and that the claimed combination may be directed to a subcombination or variation of a subcombination.

Insubstantial changes from the claimed subject matter as viewed by a person with ordinary skill in the art, now known or later devised, are expressly contemplated as being equivalently within the scope of the claims. Therefore, obvious substitutions now or later known to one with ordinary skill in the art are defined to be within the scope of the defined elements.

The claims are thus to be understood to include what is specifically illustrated and described above, what is conceptually equivalent, what can be obviously substituted and also what incorporates the essential idea of the invention.

What is claimed is:

1. An expandable structure comprising:
a main structure;
a first expansion section, the first expansion section expandable outward in a first direction from a side of the main structure;
a second expansion section, the second expansion section expandable rearward in a second direction from the main structure; and
a solar array mounted over the main structure in the stowed configuration, the solar array expandable over at least a portion of one or both of the first and second expansion sections after the expandable structure is expanded into the expanded configuration;
wherein the first expansion section includes:
a frame assembly having an outer wall, a roof extending from a top of the outer wall, and at least one guide rail extending from a bottom of the outer wall, below the roof;
a floor member pivotably and slidably attached to an inner surface of the outer wall, wherein the roof and the at least one guide rail extends into the main structure when the first expansion section is in a retracted configuration; and
side walls foldably attached to the main structure, the side walls pivotable to provide side walls of the first expansion section when in the expanded configuration.

2. The expandable structure of claim 1, further comprising a solar panel assembly expandable in a third direction, opposite the first direction.

3. The expandable structure of claim 1, wherein the solar array includes a sliding rear solar panel assembly that slides outward from the main structure to be disposed over a roof of the second expansion section.

4. The expandable structure of claim 3, wherein the solar array includes one or more extendable side solar panel assemblies that move outward from the main structure to be disposed over a roof of the first expansion section.

5. The expandable structure of claim 1, wherein the floor member is movable from a vertical orientation, when the first expansion section is in the retracted configuration, and a horizontal orientation, when the first expansion section is in the expanded configuration.

6. The expandable structure of claim 5, wherein the side walls are sandwiched between the main structure and the floor member when the first expansion section is in the retracted configuration.

7. The expandable structure of claim 1, wherein the second expansion section includes:
a frame assembly having an outer wall, a roof extending from a top of the outer wall and side walls extending downward from the roof; and
a floor member pivotably and slidably attached to an inner surface of the outer wall, wherein the roof and the side walls extend into the main structure when the second expansion section is in a retracted configuration.

8. The expandable structure of claim 7, wherein the floor member is movable from a vertical orientation, when the second expansion section is in the retracted configuration, and a horizontal orientation, when the second expansion section is in the expanded configuration.

9. The expandable structure of claim 7, wherein the floor member is sandwiched between the main structure and the outer wall when the second expansion section is in the retracted configuration.

10. An expandable structure comprising:
a main structure;
a first expansion section, the first expansion section expandable outward in a first direction from a side of the main structure; and
a second expansion section, the second expansion section expandable rearward in a second direction from the main structure, wherein:
the first expansion section includes:
a first frame assembly having a first outer wall, a first roof extending from a top of the first outer wall, and at least one guide rail extending from a bottom of the first outer wall, below the first roof;
a first floor member pivotably and slidably attached to an inner surface of the first outer wall, wherein the first roof and the at least one guide rail extends into the main structure when the first expansion section is in a retracted configuration; and
first expansion section side walls foldably attached to the main structure, the first expansion section side walls pivotable to provide side walls of the first expansion section when in the expanded configuration; and
the second expansion section includes:
a second frame assembly having a second outer wall, a second roof extending from a top of the second outer wall and second expansion section side walls extending downward from the roof; and
a second floor member pivotably and slidably attached to an inner surface of the second outer wall, wherein the second roof and the second expansion section side walls extend into the main structure when the second expansion section is in a retracted configuration.

11. The expandable structure of claim 10, further comprising a solar array mounted over the main structure in the stowed configuration, the solar array expandable over at least a portion of one or both of the first and second expansion sections after the expandable structure is expanded into the expanded configuration.

12. The expandable structure of claim 10, wherein the solar array includes:
  a solar panel assembly expandable in a third direction, opposite the first direction;
  a sliding rear solar panel assembly that slides outward from the main structure to be disposed over a roof of the second expansion section; and
  one or more extendable side solar panel assemblies that move outward from the main structure to be disposed over a roof of the first expansion section.

13. The expandable structure of claim 10, wherein the first and second floor members are movable from a vertical orientation, when the first and second expansion sections are in the retracted configuration, and a horizontal orientation, when the first and second expansion sections are in the expanded configuration.

14. The expandable structure of claim 10, wherein the first expansion section side walls are sandwiched between the main structure and the first floor member when the first expansion section is in the retracted configuration.

15. The expandable structure of claim 10, wherein the second floor member is sandwiched between the main structure and the second outer wall when the second expansion section is in the retracted configuration.

16. An expandable structure comprising:
  a main structure;
  a first expansion section, the first expansion section expandable outward in a first direction from a side of the main structure;
  a second expansion section, the second expansion section expandable rearward in a second direction from the main structure; and
  a solar array mounted over the main structure in the stowed configuration, the solar array expandable over at least a portion of one or both of the first and second expansion sections after the expandable structure is expanded into the expanded configuration, wherein:

the solar array includes:
  a solar panel assembly expandable in a third direction, opposite the first direction;
  a sliding rear solar panel assembly that slides outward from the main structure to be disposed over a roof of the second expansion section; and
  one or more extendable side solar panel assemblies that move outward from the main structure to be disposed over a roof of the first expansion section;
the first expansion section includes:
  a first frame assembly having a first outer wall, a first roof extending from a top of the first outer wall, and at least one guide rail extending from a bottom of the first outer wall, below the first roof;
  a first floor member pivotably and slidably attached to an inner surface of the first outer wall, wherein the first roof and the at least one guide rail extends into the main structure when the first expansion section is in a retracted configuration; and
  first expansion section side walls foldably attached to the main structure, the first expansion section side walls pivotable to provide side walls of the first expansion section when in the expanded configuration; and
the second expansion section includes:
  a second frame assembly having a second outer wall, a second roof extending from a top of the second outer wall and second expansion section side walls extending downward from the roof; and
  a second floor member pivotably and slidably attached to an inner surface of the second outer wall, wherein the second roof and the second expansion section side walls extend into the main structure when the second expansion section is in a retracted configuration.

17. The expandable structure of claim 16, wherein the first and second floor members are movable from a vertical orientation, when the first and second expansion sections are in the retracted configuration, and a horizontal orientation, when the first and second expansion sections are in the expanded configuration.

* * * * *